(12) United States Patent
Pan et al.

(10) Patent No.: US 7,582,543 B2
(45) Date of Patent: Sep. 1, 2009

(54) LIQUID-LIQUID INTERFACIAL SYNTHETIC METHOD FOR NANOSEMICONDUCTOR LUMINOUS MATERIAL

(75) Inventors: Daocheng Pan, Changchun (CN); Shichun Jiang, Changchun (CN); Lijia An, Changchun (CN); Bingzheng Jiang, Changchun (CN); Xiangling Ji, Changchun (CN)

(73) Assignee: Changchun Institute of Applied Chemistry Chinese Academy of Science, Changchun (CN)

( * ) Notice: Subject to any disclaimer, the term of this patent is extended or adjusted under 35 U.S.C. 154(b) by 482 days.

(21) Appl. No.: 11/072,322

(22) Filed: Mar. 7, 2005

(65) Prior Publication Data

US 2005/0221516 A1 Oct. 6, 2005

(30) Foreign Application Priority Data

Apr. 6, 2004 (CN) ........................ 2004 1 0107946

(51) Int. Cl.
 *H01L 21/20* (2006.01)
(52) U.S. Cl. ........................................ 438/478; 438/99
(58) Field of Classification Search .................. 438/22, 438/57, 479, 483, 99, 478; 427/215, 255.3; 423/566.1, 508, 594.18, 99, 101; 516/33, 516/924; 252/301.4 R, 301.36, 301.16; 117/958; 977/773; 428/402.2, 690, 917
See application file for complete search history.

(56) References Cited

U.S. PATENT DOCUMENTS

| | | | |
|---|---|---|---|
| 5,770,085 A * | 6/1998 | Wai et al. ..................... 210/638 |
| 6,576,291 B2 * | 6/2003 | Bawendi et al. ............. 427/215 |
| 6,855,202 B2 * | 2/2005 | Alivisatos et al. ............. 117/68 |
| 7,147,712 B2 * | 12/2006 | Zehnder et al. ............... 117/68 |
| 7,182,894 B2 * | 2/2007 | Kumar et al. .................. 264/41 |
| 7,273,904 B2 * | 9/2007 | Peng et al. ................. 524/439 |
| 7,332,351 B2 * | 2/2008 | Tan et al. ..................... 436/524 |
| 2003/0162393 A1 * | 8/2003 | Sato et al. .................... 438/689 |
| 2004/0202682 A1 * | 10/2004 | Emrick et al. ................ 424/400 |
| 2005/0006800 A1 * | 1/2005 | Mountziaris et al. ......... 264/4.1 |
| 2005/0020923 A1 * | 1/2005 | Frangioni et al. ........... 600/473 |
| 2005/0214536 A1 * | 9/2005 | Schrier et al. ............... 428/403 |
| 2005/0238568 A1 * | 10/2005 | Yu et al. ..................... 423/508 |
| 2006/0019427 A1 * | 1/2006 | Cao ............................ 438/95 |
| 2006/0029802 A1 * | 2/2006 | Ying et al. .................. 428/403 |
| 2006/0062902 A1 * | 3/2006 | Sager et al. .................... 427/74 |
| 2006/0088713 A1 * | 4/2006 | Dykstra et al. .............. 428/402 |
| 2006/0188431 A1 * | 8/2006 | Pan et al. ..................... 423/608 |
| 2006/0240590 A1 * | 10/2006 | Mountziaris et al. .......... 438/99 |

OTHER PUBLICATIONS

Hedi Mattoussi, et al., "Electroluminescence from heterostructures of poly(phenylenevinylene) and inorganic CdSe nanocrystal," Journal of Applied Physics, vol. 82, No. 12, Jun. 1998, pp. 7965-7974.
N.C. Greenham, et al., "Charge separation and transport in conjugated-polymer/semiconductor-nanocrystal composites studies by photoluminescence quenching and photoconductivity," Physical Review B, vol. 54, No. 24, Dec. 15, 1996, pp. 628-637.

* cited by examiner

*Primary Examiner*—Savitri Mulpuri
(74) *Attorney, Agent, or Firm*—Dickstein Shapiro LLP

(57) ABSTRACT

The present invention provides a process for producing a nanosemiconductor luminous material on a liquid-liquid interface, comprising the steps of: a) an oxide of a Group IIB metal and a carboxylic acid with 2-18 carbon atoms or an oleic acid reacting with each other in a solvent at 150-300° C. for 5-30 min, wherein the mol ratio of the oxide to the acid being 1~5:5~1; b) adding trioctylphosphine oxide and trioctylphosphine with a mol ratio of trioctylphosphine oxide to trioctylphosphine of 10~1:1~10 and a mol ratio of the total mol numbers of trioctylphosphine oxide to the oxide of 10~1: 1~10; c) adding an aqueous solution of at least one alkaline/ alkaline earth metal chalcogenide in a mol ratio of the chalcogenide to the oxide of 10~1:1~10; and d) reacting at 20-100° C. for 0.5~10 h to obtain a sol containing a semiconductor nanoparticle. The produced semiconductor nanoparticle can emit a wavelength-adjustable visible light under a UV lamp.

6 Claims, No Drawings

LIQUID-LIQUID INTERFACIAL SYNTHETIC METHOD FOR NANOSEMICONDUCTOR LUMINOUS MATERIAL

FIELD OF THE INVENTION

This invention relates to a liquid-liquid interfacial synthetic method for nanosemiconductor luminous material.

BACKGROUND OF THE INVENTION

Nanosemiconductor material is the hot spot of material science research in recent 20 years. Compared with the conventional bulk phase semiconductor, since nanosemiconductor can create a quantum size effect, so it is possible to prepare the nanoparticle with different sizes which emits luminous emission of different frenquencies by controlling a certain reaction condition and thereby the objective of regulating luminous color can be attained. In addition, owing to the feature of nanodimension, the nanosemiconductor material is made to composite easily with organic polymer or small molecule material to prepare a film type luminous device by spin coating. CdS—, CdSe-nanosemiconductor has opened an attractive prospect for applying to photoelectric conversion. Now, a major breakthrough has been achieved in the field of the material research for electroluminescence and photocell etc. A. P. Alivisatos, Phys. Rev. B, 24(1996), 17628 reports a photoelectric conversion performance of MEH-PPV composite system (conversion efficiency increases up to 12% with the increase of concentration of CdS nanoparticle). M. G. Bawendi, J. Appl. Phys., 12 (1998), 7965 reports a double layer device made of shell/core structured CdSe/CdS-nanoparticle with PPV as a hole transfer material (quantum efficiency of luminous layer up to 0.1%, life 50-100 hr). Up to now, a great number of synthetic methods for preparing Groups II-VI (such as CdS etc) metal nanoparticles have been disclosed, such as the reverse-phase fine emulsion method, the organometallic chemistry method, and the aqueous solution method. The reverse-phase fine emulsion method can be used to produce a CdS nanoparticle with a uniform particle size distribution. However, it has a low luminous efficiency and can only emit a weak red light owing to many exterior and interior defects. The organometallic chemistry method requires a very harsh synthesis condition such as an oxygen-free and water-free operating atmosphere and uses toxic and costly reagents. The aqueous solution method will result in a wide nanoparticle size distribution and a defective luminescence.

SUMMARY OF THE INVENTION

The object of this invention is to provide a liquid-liquid interfacial synthetic method for producing a nanosemiconductor luminous material.

The present invention provides a process for producing a nanosemiconductor luminous material on a liquid-liquid interface, comprising the steps of:

a) an oxide of a Group IIB metal and a carboxylic acid with 2-18 carbon atoms or an oleic acid reacting with each other in a solvent at 150-300° C. for 5-30 min, wherein the mol ratio of the oxide to the acid being 1~5:5~1;

b) adding trioctylphosphine oxide and trioctylphosphine with a mol ratio of trioctylphosphine oxide to trioctylphosphine of 10~1:1~10 and a mol ratio of the total mol numbers of trioctylphosphine oxide to the oxide of 10~1:1~10;

c) adding an aqueous solution of at least one alkaline/alkaline earth metal chalcogenide in a mol ratio of the chalcogenide to the oxide of 10~1:1~10; and d) reacting at 20-100° C. for 0.5~10 h to obtain a sol containing a semiconductor nanoparticle.

According to one preferred embodiment, the Group IIB metal is selected from a group consisting of zinc, cadmium and mercury.

According to one preferred embodiment, the alkaline/alkaline earth metal chalcogenide is selected from a group consisting of sodium sulfide, sodium hydrogen selenide and sodium hydrogen telluride.

According to one preferred embodiment, the solvent used in step a) is toluene.

According to one preferred embodiment, the carboxylic acid is selected from a group consisting of acetic acid, lauric acid, myristic acid and stearic acid.

DETAILED DESCRIPTION OF THE INVENTION

Taking advantage of the interfacial synthetic method in this invention, in a preferred embodiment of this invention, a toluene solution of alkylcarboxylate with a certain chain length or oleate is reacted with an aqueous solution of sodium sulfide, sodium hydrogen selenide or sodium hydrogen telluride, a semiconductor nanoparticle (as a precursor) is nucleated and grew on the interface, moreover coated by trioctylphosphine oxide and trioctylphosphine, exists stably, and is capable of generating a fairly strong visible light. Upon this, on the one hand the difficulties of the conventional organic phase synthesis (i.e. harsh condition) and water phase synthesis (i.e. wide nanoparticle size distribution and defective luminescence) have been overcame, and on the other hand the size of the semiconductor nanoparticle has been controlled effectively.

The synthetic route of this invention is described as follows.

Toluene (as a solvent), the oxide of Group IIB (such as ZnO, CdO, HgO or mixtures thereof) and alkylcarboxylic acid with a chain length of 2-8 carbon atoms or oleic acid (as a raw material, the mol ratio of metal oxide to said acid being 1~5:5~1) are reacted at 150~300° C. for 5~30 min, cooled to 20~100° C.; trioctylphosphine oxide and trioctylphosphine (mol ratio of trioctylphosphine oxide to trioctylphosphine being 10~1:1~10, that of the total mol number of trioctyl phosphine oxide and trioctylphosphine to said metal oxide being 10~1:1~10) are added; then 0.05 mM~1M aqueous solution of $Na_2S$, NaHSe or NaHTe (mol ratio of $Na_2S$, NaHSe or NaHTe to metal oxide being 10~1:1~10) is added into the system. The system reacts at 20~100° C. for 0.5~10 hr, to obtain a clear yellow sol containing semiconductor nanoparticles. The sol is capable of emerging a wavelength-adjustable visible light under the irradiation of a UV lamp.

The advantages of this invention are as follows: mild reaction conditions, easy to operate, short process period, and easy to industrialize.

BEST MODES OF THE INVENTION

EXAMPLE 1

Preparation of CdS-containing Nanoparticle Sol

Cadmium oxide (0.127 g, 1 mmol) and tetradecylcarboxylic acid (0.500 g) were reacted at 220° C. for 10 min, cooled to 90° C., then a cadmium tetradecylcarboxylate (precursor) was formed. Into said system, toluene (10 ml), trioctylphosphine oxide (3.866 g) and trioctylphosphine (3.7 g) were added. Then, a 0.05 M aqueous solution of sodium sulfide (10 ml) was added. After the system was reacted at 90° C. for 3 h, a clear yellow sol containing CdS nanoparticle was obtained. Said sol has the typical exciton absorption peak of CdS nanoparticle, can result in a quantum size effect and emit a fairly strong blue light under the irradiation of a UV lamp.

EXAMPLE 2

Cadmium oxide (0.127 g, 1 mmol) and acetic acid (0.500 g) were reacted at 220° C. for 10 min, cooled to 90° C., then a cadmium acetate (precursor) was formed.

Into said system, toluene (10 ml), trioctylphosphine oxide (3.866 g) and trioctylphosphine (3.7 g) were added. Then a 0.05 M aqueous solution of sodium sulfide (10 ml) was added. After the system was reacted at 90° C. for 3 h, a clear yellow sol containing CdS nanoparticles was, obtained. Said sol has a typical exiciton absorption peak of the CdS nanoparticles, can result in a quantum size effect and emit a fairly strong blue light under the irradiation of a UV lamp.

EXAMPLE 3

Cadmium oxide (0.127 g, 1 mmol) and stearic acid (0.500 g) were reacted at 220° C. for 10 min, cooled to 90° C., then a cadmium stearate (precursor) was formed. Into said system, toluene (10 ml), trioctylphosphine oxide (3.866 g) and trioctylphosphine (3.7 g) were added. Then a 0.05M aqueous solution of sodium sulfide (10 ml) was added. After the system was reacted at 90° C. for 3 h, a clear yellow sol containing CdS nanoparticles was obtained. Said sol has the typical excition absorption peak, can result in a quantum size effect and emit a fairly strong blue light under the irradiation of a UV lamp.

EXAMPLE 4

Cadmium oxide (0.127 g, 1 mmol) and dodecylcarboxylic acid (0.500 g) were reacted at 220° C. for 10 min, cooled to 90° C., then a cadmium dodecylcarboxylate (precursor) was formed. Into said system, toluene (10 ml), trioctylphosphine oxide (3.866 g) and trioctylphosphine (3.7 g) were added. Then a 0.05M aqueous solution of sodium sulfide (10 ml) was added. After the system was reacted at 90° C. for 3 h, a clear yellow sol containing CdS nanoparticles was obtained. Said sol has a typical exciton absorption peak of the CdS nanoparticles, can result in a quantum size effect and emit a fairly strong blue light under the irradiation of a UV lamp.

EXAMPLE 5

Preparation of a CdSe-containing Nanoparticle Sol

Cadmium oxide (0.127 g, 1 mmol) and tetradecylcarboxylic acid (0.500 g) were reacted at 220° C. for 10 min, cooled to 90° C., then a cadmium tetradecylcarboxylate (precursor) was formed. Into said system, toluene (10 ml), trioctylphosphine oxide (3.866 g) and trioctylphosphine (3.7 g) were added. Then a 0.05M aqueous solution of sodium hydrogen selenide (10 ml) was added. After the system was reacted at 90° C. for 3 h, a clear red sol containing the CdSe nanoparticles was obtained. Said sol has a typical exciton absorption peak of CdSe nanoparticle, can result in a quantum size effect and emit a fairly strong green light under the irradiation of a UV lamp.

EXAMPLE 6

Preparation of CdTe-containing Nanoparticle Sol

Cadmium oxide (0.127 g, 1 mmol) and tetradecylcarboxylic acid (0.500 g) were reacted at 220° C. for 10 min, cooled to 90° C., then a cadmium tetradecylcarboxylate (precursor) was formed. Into said system, toluene (10 ml), trioctylphosphine oxide (3.866 g) and trioctylphosphine (3.7 g) were added. Then a 0.05M aqueous solution of sodium hydrogen telluride (10 ml) was added. After the system was reacted at 90° C. for 3 h, a clear red sol containing CdTe nanoparticle was obtained. Said sol has a typical exciton absorption peak of the CdTe nanoparticles, can result in a quantum size effect and emit a fairly strong red light under the irradiation of a UV lamp.

EXAMPLE 7

Preparation of a ZnSe-containing Nanoparticle Sol

Zinc oxide (0.08 g, 1 mmol) and tetradecylcarboxylic acid (0.500 g) were reacted at 220° C for 10 min, cooled to 90° C., then a zinc tetradecylcarboxylate (precursor) was formed. Into said system, toluene (10 ml), trioctylphosphine oxide (3.866 g) and trioctylphosphine (3.7 g) were added. Then a 0.05M aqueous solution of sodium hydrogen selenide (10 ml) was added. After the system was reacted at 90° C. for 3 h, a clear yellow sol containing the ZnSe nanoparticles was obtained. Said sol has a typical exciton absorption peak of the ZnSe nanoparticles, can result in a quantum size effect and emit a fairly strong blue light under the irradiation of a UV lamp.

EXAMPLE 8

Preparation of HgTe-containing Nanoparticle Sol

Mercuric oxide (0.216 g, 1 mmol) and tetradecylcarboxylic acid (0.500 g) were reacted at 220° C. for 10 min, cooled to 90° C., a mercury tetradecylcarboxylate (precursor) was formed. Into said system, toluene (10 ml), trioctylphosphine oxide (3.866 g) and trioctylphosphine (3.7 g) were added. Then a 0.05M aqueous solution of sodium hydrogen telluride (10 ml) was added. After the system was reacted at 90° C. for 3 h, a clear red sol containing the HgTe nanoparticles was obtained. Said sol has a typical exciton absorption peak of HgTe nano-particles, can result in a quantum size effect and emit a fairly strong red light under the irradiation of a UV lamp.

EXAMPLE 9

Preparation of Dodecyl Mercaptan-coated CdSe Nanoparticle Sol

Cadmium oxide (0.127 g, 1 mmol) and tetradecylcarboxylic acid (0.500 g) were reacted at 220° C. for 10 min, cooled to 90° C., then a cadmium tetradecylcarboxylate (precursor) was formed. Into said system, toluene (10 ml), dodecyl mercaptan (1.2 ml) and tetraoctylammonium bromide (0.546 g, as a phase-transfer catalyst) and trioctylphosphine (3.7 g) were added. Then a 0.05M aqueous solution of sodium hydrogen selenide (10 ml) was added. After the system was reacted at 90° C. for 3 h, a red sol containing the dodecyl mercaptan-coated CdSe nanoparticles was obtained. The sol has a typical exciton absorption peak of the ZnSe nanoparticles, can result

EXAMPLE 10

Preparation of Mercaptoethanol Coated CdSe Nanoparticle Sol

Cadmium oxide (0.127 g, 1 mmol) and tetradecyl carboxylic acid (0.500 g) were reacted at 220° C. for 10 min, cooled to 90° C., a cadmium tetradecylcarboxylate (precursor) was formed. Into said system, toluene (10 ml) and mercaptoetanol (0.6 ml) was added. Then a 0.05M aqueous solution of sodium hydrogen selenide (10 ml) was added. After the system was reacted at 90° C. for 3 h, a red sol containing the mercaptoethanol-coated CdSe nanoparticles was obtained. Said sol can be dispersed stably in water, has a typical exciton absorption peak of the CdSe nanoparticles, can result in a quantum size effect and emit a fairly strong green light under the irradiation of a UV lamp.

We claim:

1. A liquid-liquid interfacial method for synthesizing colloidal semiconductor nanocrystals, the method comprising:
   forming a first oil-soluble precursor solution by dissolving a Group IIB metal alkylcarboxylate salt in toluene;
   adding a capping agent into the first oil-soluble precursor solution;
   forming a second water-soluble precursor solution by dissolving an alkaline/alkaline earth metal chalcogenide in water;
   mixing the first and second precursor solutions into a multi-phase system to form colloidal nanocrystals at a liquid-liquid interface of the multi-phase system, wherein said oil-soluble precursor solution and the water-soluble precursor solution are spatially separated in a two-phase system; and
   making the resulting nanocrystals be capped by and dispersed in an organic phase.

2. The method according to claim 1, wherein said first oil-soluble precursor solution comprises Group IIB metal alkylcarboxylate salt with 2-18 carbon atoms.

3. The method according to claim 1, wherein said water-soluble precursor solution comprises sodium sulfide, sodium hydrogen selenide or sodium hydrogen telluride.

4. The method according to claim 1, wherein said capping agent comprises oleic acid, trioctylphosphine oxide and/or trioctylphosphine.

5. The method according to claim 1, wherein the first and second precursor solutions are mixed at a temperature in a range from about 20 degree to about 100 degree.

6. The method according to claim 1, wherein said Group IIB-VI compounds comprise ZnS, ZnSe, ZnTe, CdS, CdSe, CdTe, HgS, HgSe, HgTe.

* * * * *